(12) United States Patent
Juhasz et al.

(10) Patent No.: US 6,691,801 B2
(45) Date of Patent: Feb. 17, 2004

(54) LOAD COMPENSATOR FOR A PIPE RUNNING TOOL

(75) Inventors: Daniel Juhasz, Westminister, CA (US); George Boyadjieff, Bell Park, CA (US); Brian L. Eidem, Cerritos, CA (US); Hans Van Rijzingen, Etten-Leur (NL)

(73) Assignee: Varco I/P, Inc., Houston, TX (US)

( * ) Notice: Subject to any disclaimer, the term of this patent is extended or adjusted under 35 U.S.C. 154(b) by 0 days.

(21) Appl. No.: 09/952,868

(22) Filed: Sep. 14, 2001

(65) Prior Publication Data

US 2002/0043403 A1 Apr. 18, 2002

Related U.S. Application Data

(63) Continuation-in-part of application No. 09/518,122, filed on Mar. 3, 2000, now Pat. No. 6,443,241.
(60) Provisional application No. 60/122,915, filed on Mar. 5, 1999.

(51) Int. Cl.[7] .............................. E21B 44/00; F16F 9/18
(52) U.S. Cl. .......................... 175/27; 166/53; 254/277; 267/125
(58) Field of Search ....................... 254/277; 267/64.26, 267/125; 175/24, 27, 57; 166/53

(56) References Cited

U.S. PATENT DOCUMENTS

| | | | |
|---|---|---|---|
| 3,193,116 A | 7/1965 | Kenneday et al. | 214/2.5 |
| 3,839,976 A | * 10/1974 | Swenson et al. | 114/0.5 D |
| 3,960,360 A | * 6/1976 | Elliston | 254/139.1 |
| 4,449,596 A | 5/1984 | Boyadjieff | 175/85 |
| 4,529,045 A | 7/1985 | Boyadjieff et al. | 173/164 |
| 4,570,706 A | 2/1986 | Pugnet | 166/77.5 |
| 4,605,077 A | 8/1986 | Boyadjieff | 175/85 |
| 4,709,766 A | 12/1987 | Boyadjieff | 175/85 |
| 4,781,359 A | 11/1988 | Matus | 267/71 |
| 4,791,997 A | 12/1988 | Krasnov | 175/57 |
| 5,785,132 A | 7/1998 | Richardson et al. | 175/57 |
| 5,839,330 A | 11/1998 | Stokka | 81/57.33 |
| 6,068,240 A | * 5/2000 | Leveugle | 254/277 |
| 6,443,241 B1 | * 9/2002 | Juhasz et al. | 175/52 |

FOREIGN PATENT DOCUMENTS

| | | | |
|---|---|---|---|
| EP | 0 311 455 | 4/1989 | E21B/19/16 |
| EP | 0 525 247 | 2/1993 | E21B/3/02 |
| WO | WO 96/18799 | 6/1996 | E21B/19/16 |
| WO | WO 98/11322 | 3/1998 | E21B/19/16 |
| WO | WO 99/3000 | 6/1999 | |
| WO | WO 00/52297 | 9/2000 | |

OTHER PUBLICATIONS

International Search Report relating to corresponding International Application No. PCT/US00/05752 dated Sep. 28, 2000.
Invitation to Pay Additional Fees relating to corresponding International Application No. PCT/US00/05752 dated Jun. 30, 2002.
Kamphorst et al., "Casing Running Tool," SPE/IADC 52770; pp. 1–9.
International Search Report for PCT/US02/29946; pp. 1–3.

* cited by examiner

*Primary Examiner*—William Neuder
(74) *Attorney, Agent, or Firm*—Christie, Parker & Hale, LLP (57) ABSTRACT

A load compensator is disclosed for use in connection with a pipe running tool. The load compensator includes an outer housing connected to the portion of the pipe running tool that holds the pipe segment. A piston is disposed within the housing, and is connected to a top drive system of the pipe running tool. The housing is formed with a first port through which pressurized air is delivered inside the housing to drive the piston within the housing. A second port is disposed at a selected location on the housing, such that when the piston is advanced past the second port, pressurized air passes through the port, and causes the control circuit to stop delivering air through the first port. Once pressurized air no longer flows through the second port, the control circuit causes air to be delivered to the first port.

26 Claims, 10 Drawing Sheets

LOAD COMPENSATOR FOR A PIPE RUNNING TOOL

CROSS-REFERENCE TO RELATED APPLICATION(S)

This application is a continuation-in-part of patent application Ser. No. 09/518,122, filed Mar. 3, 2000 now U.S. Pat. No. 6,443,241, which claims priority to provisional patent application serial No. 60/122,915 filed Mar. 5, 1999.

BACKGROUND OF THE INVENTION

1. Field of the Invention

This invention relates to well drilling operations and, more particularly, to a device for assisting in the assembly of pipe strings, such as casing strings, drill strings and the like.

2. Description of the Related Art

The drilling of oil wells involves assembling drill strings and casing strings, each of which comprises a plurality of elongated, heavy pipe segments extending downwardly from an oil drilling rig into a hole. The drill string consists of a number of sections of pipe which are threadedly engaged together, with the lowest segment (i.e., the one extending the furthest into the hole) carrying a drill bit at its lower end. Typically, the casing string is provided around the drill string to line the well bore after drilling the hole and ensure the integrity of the hole. The casing string also consists of a plurality of pipe segments which are threadedly coupled together and formed with through passages sized to receive the drill string and/or other pipe strings.

The conventional manner in which plural casing segments are coupled together to form a casing string is a labor-intensive method involving the use of a "stabber" and casing tongs. The stabber is manually controlled to insert a segment of casing into the upper end of the existing casing string, and the tongs are designed to engage and rotate the segment to threadedly connect it to the casing string. While such a method is effective, it is cumbersome and relatively inefficient because the procedure is done manually. In addition, the casing tongs require a casing crew to properly engage the segment of casing and to couple the segment to the casing string. Thus, such a method is relatively labor-intensive and therefore costly. Furthermore, using casing tongs requires the setting up of scaffolding or other like structures, and is therefore inefficient.

Others have proposed a casing running tool for assembling casing strings which utilizes a conventional top drive assembly. The tool includes a pivotable manipulator which is designed to engage a pipe segment and raise the pipe segment up into a power assist spider, which relies on gravity to hold the pipe segment. The spider is coupled to the top drive and may be rotated by it. Thus, the pipe segment may be brought into contact with a casing string and the top drive activated to rotate the casing segment and threadedly engage it with the casing string.

While such a system provides benefits over the more conventional systems used to assemble casing strings, such a system suffers from shortcomings. One such shortcoming is that the casing segment may not be sufficiently engaged by the power assist spider to properly connect the casing segment with the casing string. In addition, the system fails to provide any means for effectively controlling the load applied to the threads at the bottom of the casing segment, as well as to the top of the casing string when the casing segment is lowered onto the string. Without the ability to control these loads, cross-threading may occur, resulting in stripped threads and a useless casing segment.

Accordingly, it will be apparent to those skilled in the art that there continues to be a need for a device for use in a drilling system which utilizes an existing top drive assembly to efficiently assemble casing and/or drill strings, and which positively engages a pipe segment to ensure proper coupling of the pipe segment to a pipe string. In addition, the need exists for a load compensator to compensate for both upwardly and downwardly directed loads that are applied to either the casing string or the casing segment. The present invention addresses these needs and others.

SUMMARY OF THE INVENTION

Briefly, and in general terms, the present invention is directed to a pipe running tool for use in drilling systems and the like to assemble casing and/or drill strings. The pipe running tool is coupled to an existing top drive assembly which is used to rotate a drill string, and includes a powered elevator that is powered into an engaged position to securely engage a pipe segment, for example, a casing segment. Because the elevator is powered into the engaged position, the pipe segment may be properly coupled to an existing pipe string using the top drive assembly.

The system of the present invention in one illustrative embodiment is directed to a pipe running tool mountable on a rig and including: a top drive assembly adapted to be connected to the rig for vertical displacement of the top drive assembly relative to the rig, the top drive assembly including a drive shaft, the top drive assembly being operative to rotate the drive shaft; and a lower pipe engagement assembly including a central passageway sized for receipt of the pipe segment, the lowerpipe engagement assembly including a powered engagement device that is powered to an engaged position to securely and releasably grasp the pipe segment, the lower pipe engagement assembly being in communication with the drive shaft, whereby actuation of the top drive assembly causes the lower pipe engagement assembly to rotate.

In another illustrative embodiment, the present invention is directed to a method of assembling a pipe string, including the steps of: actuating a lower pipe engagement assembly to releasably engage a pipe segment; lowering a top drive assembly to bring the pipe segment into contact with a pipe string; monitoring the load on the pipe string; actuating a load compensator to raise the pipe segment a selected distance relative to the pipe string, if the load on the pipe string exceeds a predetermined threshold value; and actuating the top drive assembly to rotate the pipe segment to threadedly engage the pipe segment and pipe string.

In yet another embodiment, the invention is directed to a load compensator for use in connection with a pipe running tool. The load compensator includes an outer housing connected to the pipe running tool that holds the pipe segment. A piston is disposed within the housing, and is connected to a top drive system. The housing includes a first port through which pressurized air is delivered inside the housing to drive the piston within the housing. A second port is disposed at a selected location on the housing, such that when the piston is advanced past the second port, pressurized air passes through the port, and causes the control circuit to stop delivering air through the first port. Once pressurized air no longer flows through the second port, the control circuit causes air to be delivered to the first port.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENTS

Figure 1:
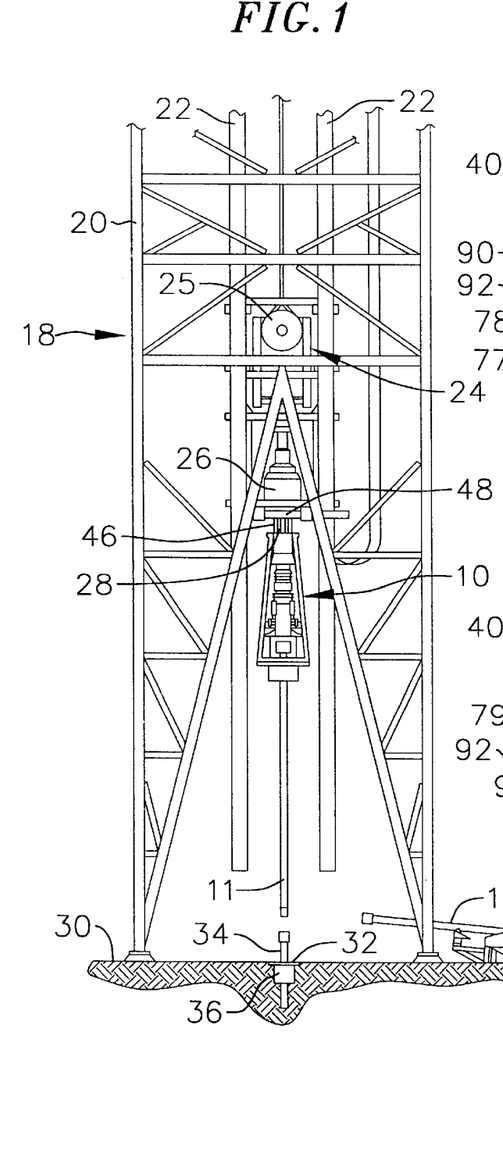
FIG. 1 is an elevated side view of a drilling rig incorporating a pipe running tool according to one illustrative embodiment of the present invention.
Figures 2, 4:
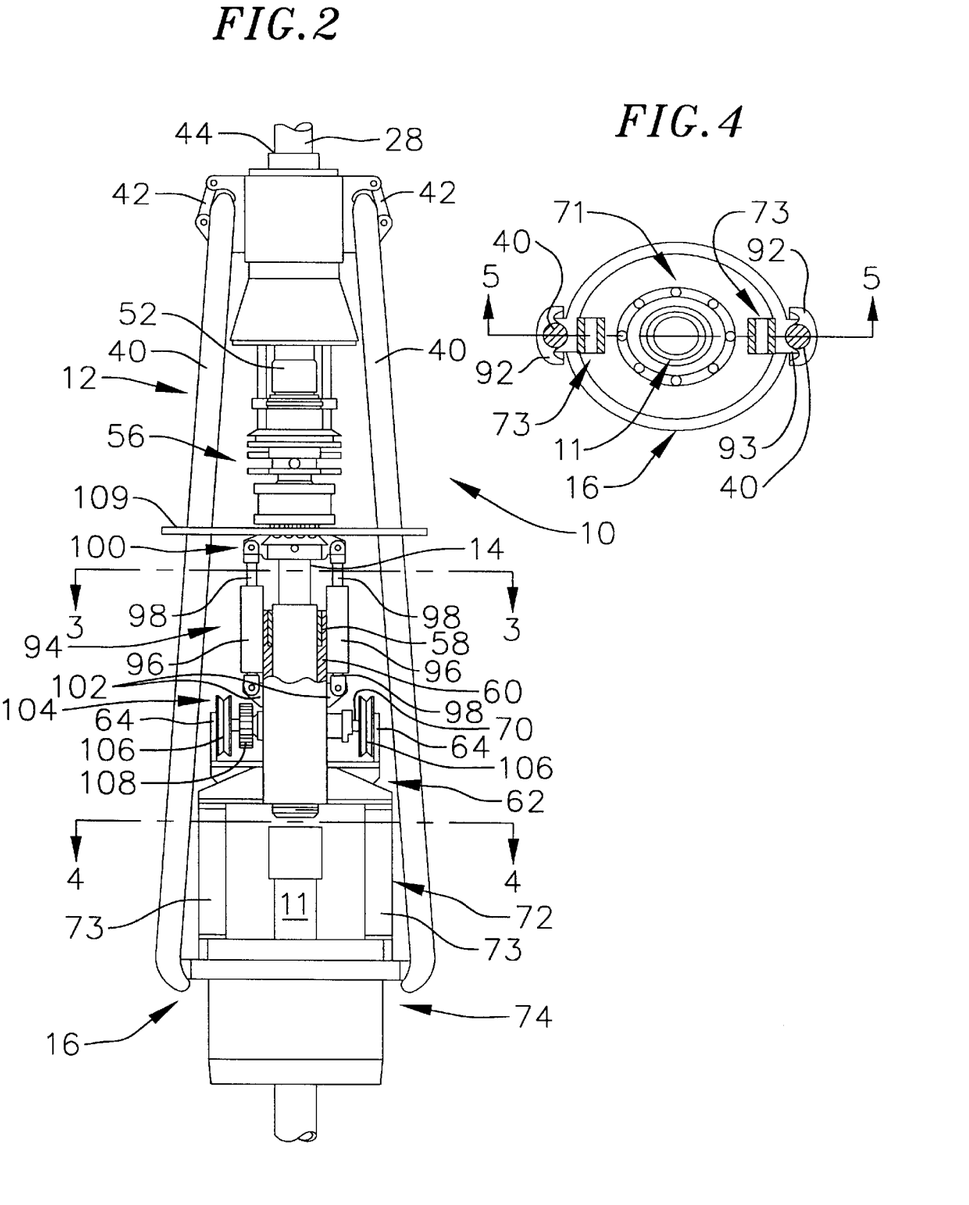
FIG. 2 is a side view, in enlarged scale, of the pipe running tool of FIG. 1.
FIG. 4 is a cross-sectional view taken along the line 4—4 of FIG. 2.
Figure 3:
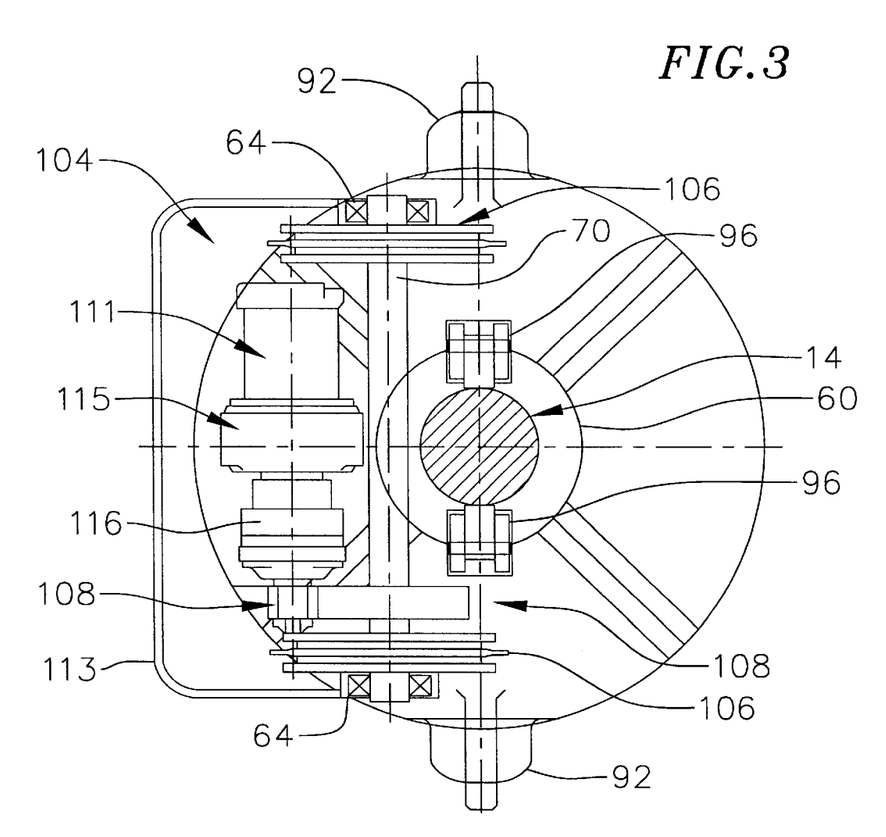
FIG. 3 is a cross-sectional view taken along the line 3—3 of FIG. 2.

In the following detailed description, like reference numerals will be used to refer to like or corresponding elements in the different figures of the drawings. Referring now to FIGS. 1 and 2, there is shown a pipe running tool 10 depicting one illustrative embodiment of the present invention, which is designed for use in assembling pipe strings, such as drill strings, casing strings, and the like. The pipe running tool 10 comprises, generally, a frame assembly 12, a rotatable shaft 14, and a lower pipe engagement assembly 16 that is coupled to the rotatable shaft for rotation therewith. The pipe engagement assembly is designed for selective engagement of a pipe segment 11 (FIGS. 1, 2, and 5A) to substantially prevent relative rotation between the pipe segment and the pipe engagement assembly. The rotatable shaft 14 is designed for coupling with a top drive output shaft from an existing top drive, such that the top drive, which is normally used to rotate drill string to drill a well hole, may be used to assemble a pipe string, for example, a casing string or a drill string, as is described in greater detail below.

The pipe running tool 10 is designed for use, for example, in a well drilling rig 18. A suitable example of such a rig is disclosed in U.S. Pat. No. 4,765,401 to Boyadjieff, which is expressly incorporated herein by reference as if fully set forth herein. As shown in FIG. 1, the rig includes a frame 20 and a pair of guide rails 22 along which a top drive assembly, generally designated 24, may ride for vertical movement relative to the rig. The top drive assembly is preferably a conventional top drive used to rotate a drill string to drill a well hole, as is described in U.S. Pat. No 4,605,077 to Boyadjieff, which is expressly incorporated herein by reference. The top drive assembly includes a drive motor 26 and a top drive output shaft 28 extending downwardly from the drive motor, with the drive motor being operative to rotate the drive shaft, as is conventional in the art. The rig defines a drill floor 30 having a central opening 32 through which a drill string and/or casing string 34 is extended downwardly into a well hole.

The rig 18 also includes a flush-mounted spider 36 that is configured to releasably engage the drill string and/or casing string 34 and support the weight thereof as it extends downwardly from the spider into the well hole. As is well known in the art, the spider includes a generally cylindrical housing which defines a central passageway through which the pipe string may pass. The spider includes a plurality of slips which are located within the housing and are selectively displaceable between disengaged and engaged positions, with the slips being driven radially inwardly to the respective engaged positions to tightly engage the pipe segment and thereby prevent relative movement or rotation of the pipe segment and the spider housing. The slips are preferably driven between the disengaged and engaged positions by means of a hydraulic or pneumatic system, but may be driven by any other suitable means.

Referring primarily to FIG. 2, the pipe running tool 10 includes the frame assembly 12, which comprises a pair of links 40 extending downwardly from a link adapter 42. The link adapter defines a central opening 44 through which the top drive output shaft 28 may pass. Mounted to the link adapter on diametrically opposed sides of the central opening are respective upwardly extending, tubular members 46 (FIG. 1), which are spaced a predetermined distance apart to allow the top drive output shaft 28 to pass therebetween. The respective tubular members connect at their upper ends to a rotating head 48, which is connected to the top drive assembly 24 for movement therewith. The rotating head defines a central opening (not shown) through which the top drive output shaft may pass, and also includes a bearing (not shown) which engages the upper ends of the tubular members and permits the tubular members to rotate relative to the rotating head body, as is described in greater detail below.

The top drive output shaft 28 terminates at its lower end in an internally splined coupler 52 which is engaged to an upper end of the lower drive shaft 14 (not shown) which is formed to complement the splined coupler for rotation therewith. Thus, when the top drive output shaft 28 is rotated by the top drive motor 26, the lower drive shaft 14 is also rotated. It will be understood that any suitable interface may be used to securely engage the top and lower drive shafts together.

In one illustrative embodiment, the lower drive shaft 14 is connected to a conventional pipe handler, generally designated 56, which may be engaged by a suitable torque wrench (not shown) to rotate the lower drive shaft and thereby make and break connections that require very high torque, as is well known in the art.

The lower drive shaft 14 is also formed with a splined segment 58, which is slidably received in an elongated, splined bushing 60 which serves as an extension of the lower drive shaft. The drive shaft and bushing are splined to provide for vertical movement of the shaft relative to the bushing, as is described in greater detail below. It will be understood that the splined interface causes the bushing to rotate when the lower drive shaft rotates.

The pipe running tool 10 further includes the lower pipe engagement assembly 16, which in one embodiment comprises a torque transfer sleeve 62 which is securely connected to the lower end of the bushing 60 for rotation therewith. The torque transfer sleeve is generally annular and includes a pair of upwardly projecting arms 64 on diametrically opposed sides of the sleeve. The arms are formed with respective horizontal through passageways (not shown) into which are mounted respective bearings (not shown) which serve to journal a rotatable axle 70 therein, as described in greater detail below. The transfer sleeve connects at its lower end to a downwardly extending torque frame 72 in the form of a pair of tubular members 73, which in turn is coupled to a spider\elevator 74 which rotates with the torque frame. It will be apparent that the torque frame may take many, such as a plurality of tubular members, a solid body, or any other suitable structure.

Figure 5A:
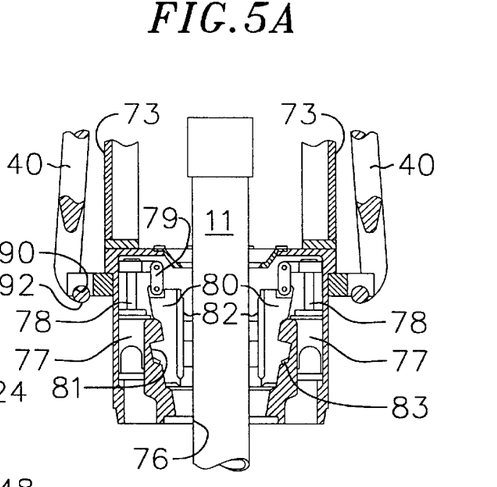
FIG. 5A is a cross-sectional view taken along the line 5—5 of FIG. 4 and showing a spider\elevator in a disengaged position.
Figure 5B:
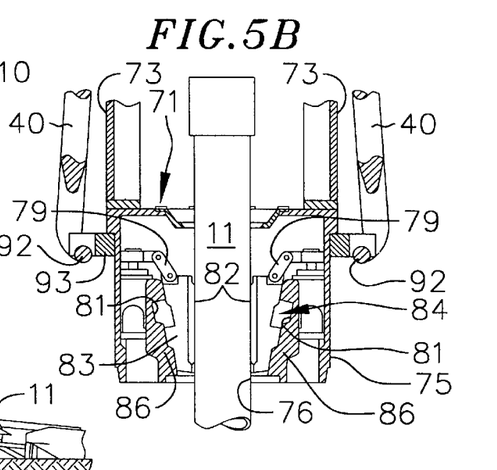
FIG. 5B is a cross-sectional view similar to FIG. 5A and showing the spider\elevator in an engaged position.

The spider\elevator 74 is preferably powered by a hydraulic or pneumatic system, or alternatively by an electric drive motor or any other suitable powered system. In the embodiment disclosed, the spider\elevator includes a housing 75 which defines a central passageway 76 through which the pipe segment 11 may pass. The spider\elevator also includes a pair of hydraulic or pneumatic cylinders 77 with displaceable piston rods 78 (FIGS. 5A and 5B) which are connected through suitable pivotable linkages 79 to respective slips 80. The linkages are pivotally connected to both the top ends of the piston rods and to the top ends of the slips. The slips include generally planar front gripping surfaces 82, and specially contoured rear surfaces 84 which are designed with such a contour to cause the slips to travel between respective radially outwardly disposed, disengaged positions, and radially inwardly disposed, engaged positions. The rear surfaces of the slips travel along respective downwardly and radially inwardly projecting guiding members 86 which are complementarily contoured and securely connected to the spider body. The guiding members cooperate with the cylinders and linkages to cam the slips radially inwardly and force the slips into the respective engaged positions. Thus, the cylinders (or other actuating means) may be empowered to drive the piston rods downwardly, causing the corresponding linkages to be driven downwardly and therefore force the slips downwardly. The surfaces of the guiding members are angled to force the slips radially inwardly as they are driven downwardly to sandwich the pipe segment 11 between them, with the guiding members maintaining the slips in tight engagement with the pipe segment. To release the pipe segment 11, the cylinders 76 are operated in reverse to drive the piston rods upwardly, which draws the linkages upwardly and retracts the respective slips back to their disengaged positions to release the pipe segment. The guiding members are preferably formed with respective notches 81 which receive respective projecting portions 83 of the slips to lock the slips in the disengaged position (FIG. 5A).

The spider\elevator 74 further includes a pair of diametrically opposed, outwardly projecting ears 88 formed with downwardly facing recesses 90 sized to receive correspondingly formed, cylindrical members 92 at the bottom ends of the respective links 40, and thereby securely connect the lower ends of the links to the spider\elevator. The ears may be connected to an annular sleeve 93 which is received over the housing 75, or may be formed integral with the housing.

In one illustrative embodiment, the pipe running tool 10 includes a load compensator, generally designated 94. The load compensator preferably is in the form of a pair of hydraulic, double rodded cylinders 96, each of which includes a pair of piston rods 98 that are selectively extendable from, and retractable into, the cylinder. The upper rods connect to a compensator clamp 100, which in turn is connected to the lower drive shaft 14, while the lower rods extend downwardly and connect at the respective lower ends to a pair of ears 102 which are securely mounted to the bushing 60. The hydraulic cylinders may be actuated to draw the bushing upwardly relative to the lower drive shaft 14 by applying a pressure to the cylinders which causes the upper piston rods to retract into the respective cylinder bodies, with the splined interface between the bushing and lower drive shaft allowing the bushing to be displaced vertically relative to the shaft. In that manner, the pipe segment 11 carried by the spider\elevator 74 may be raised vertically to relieve a portion or all of the load applied to the pipe segment 11, as is described in greater detail below. As is shown in FIG. 2, the lower rods are at least partially retracted, resulting in the majority of the load from the pipe running tool 10 is assumed by the top drive output shaft 28. In addition, when a load above a preselected maximum is applied to the pipe segment 11, the cylinders 96 will automatically react the load to prevent the entire load from being applied to the threads of the pipe segment.

The pipe running tool 10 still further includes a hoist mechanism, generally designated 104, for hoisting a pipe segment upwardly into the spider\elevator 74. The hoist mechanism is disposed off-axis and includes a pair of pulleys 106 carried by the axle 70, the axle being journaled into the bearings in respective through passageways formed in the arms 64. The hoist mechanism also includes a gear drive, generally designated 108, that may be selectively driven by a hydraulic motor 111 or other suitable drive system to rotate the axle and thus the pulleys. The hoist may also include a brake 115 to prevent rotation of the axle and therefore of the pulleys and lock them in place, as well as a torque hub 116. Therefore, a pair of chains, cables, or other suitable, flexible means may be run over the respective pulleys, extended through a chain well 113, and engaged to the pipe segment 11, and the axle is then rotated by a suitable drive system to hoist the pipe segment vertically and up into position with the upper end of the pipe segment 11 extending into the spider\elevator 74.

The pipe running tool 10 preferably further includes an annular collar 109 which is received over the links 40 and which maintains the links locked to the ears 88 and prevents the links from twisting and/or winding.

In use, a work crew may manipulate the pipe running tool 10 until the upper end of the tool is aligned with the lower end of the top drive output shaft 28. The pipe running tool 10 is then raised vertically until the splined coupler 52 at the lower end of the top drive output shaft is engaged to the upper end of the lower drive shaft 14 and the links 40 are engaged with the ears 93. The work crew may then run a pair of chains or cables over the respective pulleys 106 of the hoist mechanism 104, connect the chains or cables to a pipe segment 11, engage a suitable drive system to the gear 108, and actuate the drive system to rotate the pulleys and thereby hoist the pipe segment upwardly until the upper end of the pipe segment extends through the lower end of the spider\elevator 74. The spider\elevator is then actuated, with the hydraulic cylinders 77 and guiding members 86 cooperating to forcibly drive the respective slips 84 into the engaged positions (FIG. 5B) to positively engage the pipe segment. The slips are preferably advanced to a sufficient extent to prevent relative rotation between the pipe segment and the spider\elevator, such that rotation of the spider\elevator translates into rotation of the pipe segment.

The top drive assembly 24 is then lowered relative to the frame 20 by means of the top hoist 25 to drive the threaded lower end of the pipe segment 11 into contact with the threaded upper end of the pipe string 34 (FIG. 1). As shown in FIG. 1, the pipe string is securely held in place by means of the flush-mounted spider 36 or any other suitable structure for securing the string in place, as is well known to those skilled in the art. Once the threads are properly mated, the top drive motor 26 is then actuated to rotate the top drive output shaft, which in turn rotates the lower drive shaft of the pipe running tool 10 and the spider\elevator 74, which causes the coupled pipe segment to rotate and thereby be threadedly engaged to the pipe string.

In one embodiment, the pipe segment 11 is intentionally lowered until the lower end of the pipe segment rests on the top of the pipe string 34. The load compensator 94 is then actuated to drive the bushing 60 upwardly relative to the lower drive shaft 14 via the splined interface between the two. The upward movement of the bushing causes the spider\elevator 74 and therefore the coupled pipe segment 11 to be raised, thereby reducing the weight on the threads of the pipe segment. In this manner, the load on the threads can be controlled by actuating the load compensator.

Once the pipe segment 11 is threadedly coupled to the pipe string, the top drive assembly 24 is raised vertically to lift the entire pipe string 34, which causes the flush-mounted spider 36 to disengage the string. The top drive assembly 24 is then lowered to advance the string downwardly into the well hole until the upper end of the top pipe segment 11 is close to the drill floor 30, with the entire load of the pipe string being carried by the links 40 while the torque was supplied through shafts. The flush-mounted spider 36 is then actuated to engage the pipe string and suspend it therefrom. The spider\elevator 74 is then controlled in reverse to retract the slips 84 back to the respective disengaged positions (FIG. 5A) to release the pipe string. The top drive assembly 24 is then raised to lift the pipe running tool 10 up to a starting position (such as that shown in FIG. 1) and the process may be repeated with an additional pipe segment 11.

Figure 6:
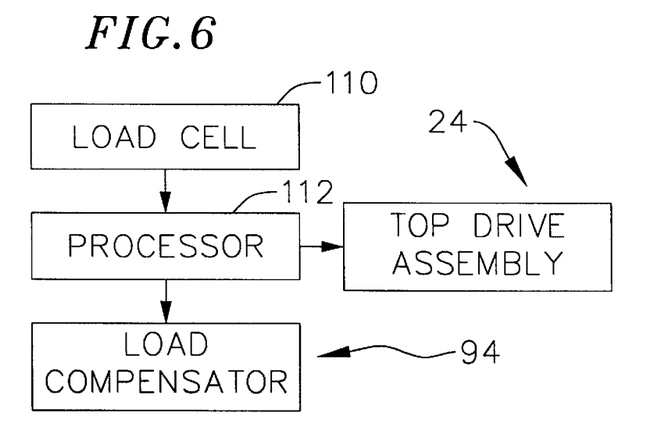
FIG. 6 is a block diagram of components included in one illustrative embodiment of the invention.

Referring to FIG. 6, there is shown a block diagram of components included in one illustrative embodiment of the pipe running tool 10. In this embodiment, the tool includes a conventional load cell 110 or other suitable load-measuring device mounted on the pipe running tool 10 in such a manner that it is in communication with the lower drive shaft 14 to determine the load applied to the lower end of the pipe segment 11. The load cell is operative to generate a signal representing the load sensed, which in one illustrative embodiment is transmitted to a processor 112. The processor is programmed with a predetermined threshold load value, and compares the signal from the load cell with that value. If the load exceeds the value, the processor then controls the load compensator 94 to draw upwardly a selected amount to relieve at least a portion of the load on the threads of the pipe segment. Once the load is at or below the threshold value, the processor controls the top drive assembly 24 to rotate the pipe segment 11 and thereby threadedly engage the pipe segment to the pipe string 34. While the top drive assembly is actuated, the processor continues to monitor the signals from the load cell to ensure that the load on the pipe segment does not exceed the threshold value.

Alternatively, the load on the pipe segment 11 may be controlled manually, with the load cell 110 indicating the load on the pipe segment via a suitable gauge or other display, with a work person controlling the load compensator 94 and top drive assembly 24 accordingly.

Figure 7:
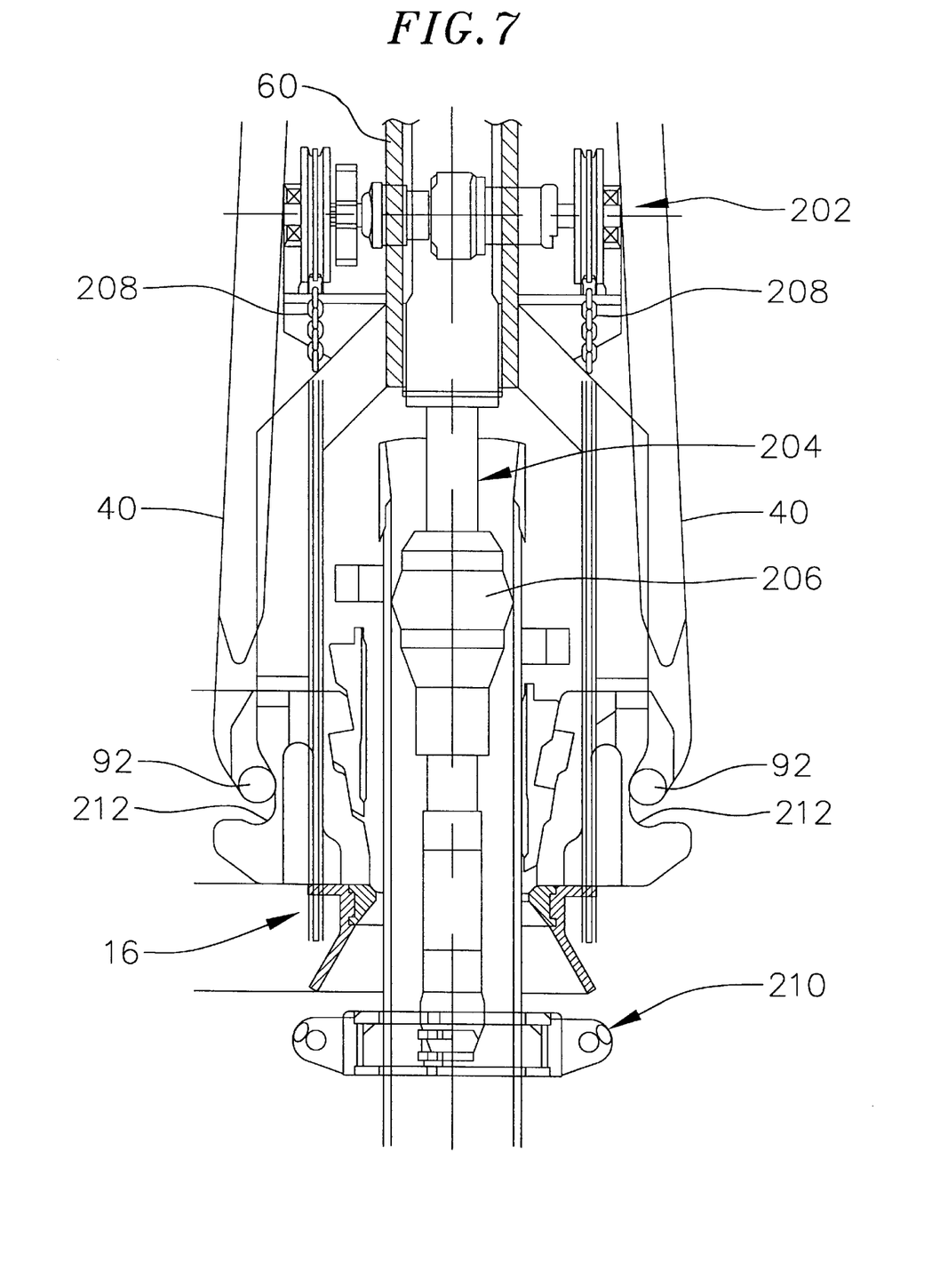
FIG. 7 is a side view of another illustrative embodiment of the invention.

Referring to FIG. 7, there is shown another preferred embodiment of the pipe running tool 200 of the present invention. The pipe running tool includes a hoisting mechanism 202 which is substantially the same as the hoisting mechanism 104 described above. A lower drive shaft 204 is provided and connects at its lower end to a conventional mud-filling device 206 which, as is known in the art, is used to fill a pipe segment, for example, a casing segment, with mud during the assembly process. In one illustrative embodiment, the mud-filling device is a device manufactured by Davies-Lynch Inc. of Texas.

The hoisting mechanism 202 supports a pair of chains 208 which engage a slip-type single joint elevator 210 at the lower end of the pipe running tool 200. As is known in the art, the single joint elevator is operative to releasably engage a pipe segment 11, with the hoisting mechanism 202 being operative to raise the single joint elevator and pipe segment upwardly and into the spider\elevator 74.

The tool 200 includes the links 40 which define the cylindrical lower ends 92 which are received in generally J-shaped cut-outs 212 formed in diametrically opposite sides of the spider\elevator 74.

Referring now to FIGS. 8, 9A–D and 10, there is shown a system 300 for load compensation according to another aspect of the invention. System 300 is operative to offset the load on a plurality of compression springs 302 that support the pipe running tool 10 and a pipe segment carried by pipe running tool 10 (hereinafter "CRT body"). As is shown schematically in FIG. 8 and in top view cross-section in FIG. 10, the compression springs 302 support the CRT body 10 in an attempt to prevent excessively large loads from being applied to the pipe string, thereby facilitating the make-up of a pipe string. However, in certain situations the compression springs cannot offset the load. Because of this, system 300 is provided adjacent to the compression springs 302 to assist the compression springs 302 in compensating for the load from the CRT body 10.

Figure 8:
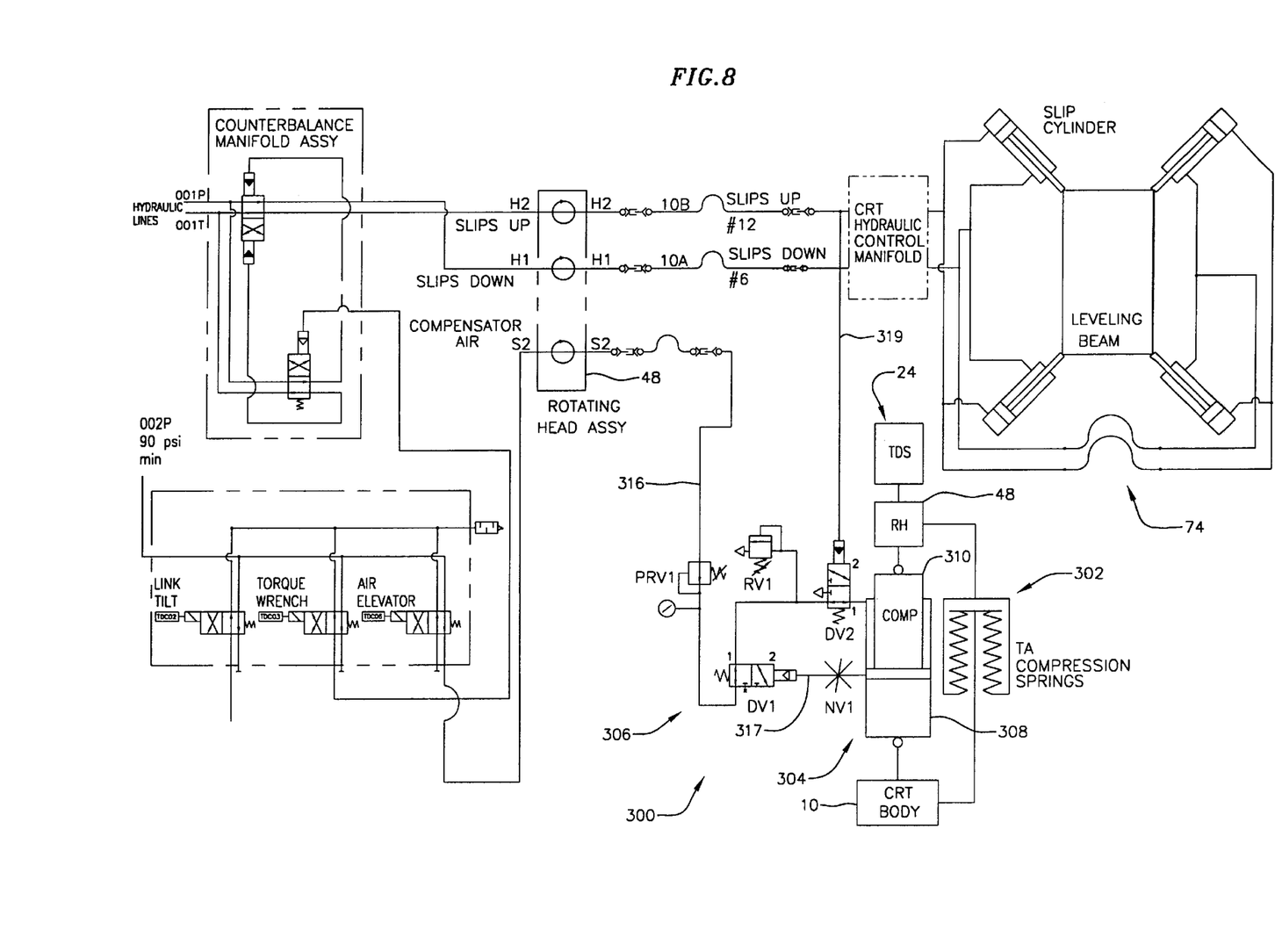
FIG. 8 is a schematic diagram of a load compensator according to one illustrative embodiment of the invention.

System 300 includes, generally, a load compensator 304 and a control circuit 306. The load compensator 304 includes an outer housing (hereinafter referred to as a "barrel") 308 and a piston 310 slidably disposed within the barrel. Barrel 308 is connected to the CRT body 10, while the piston 310 is connected to the rotating head 48 or other suitable component of the top drive assembly 24.

Figure 9A:
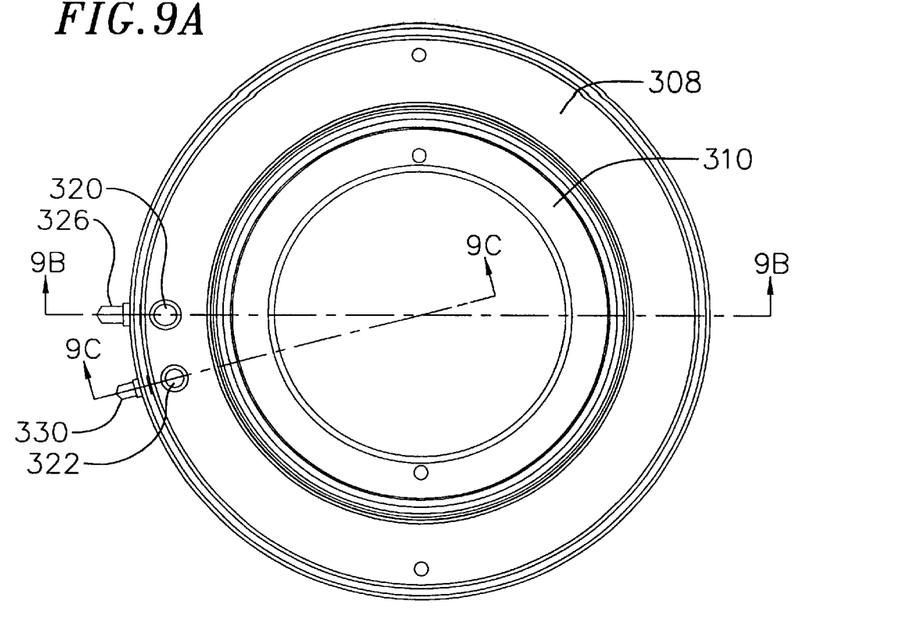
FIG. 9A is a sectional view of a portion of the load compensator according to one embodiment of the invention.
Figure 9B:
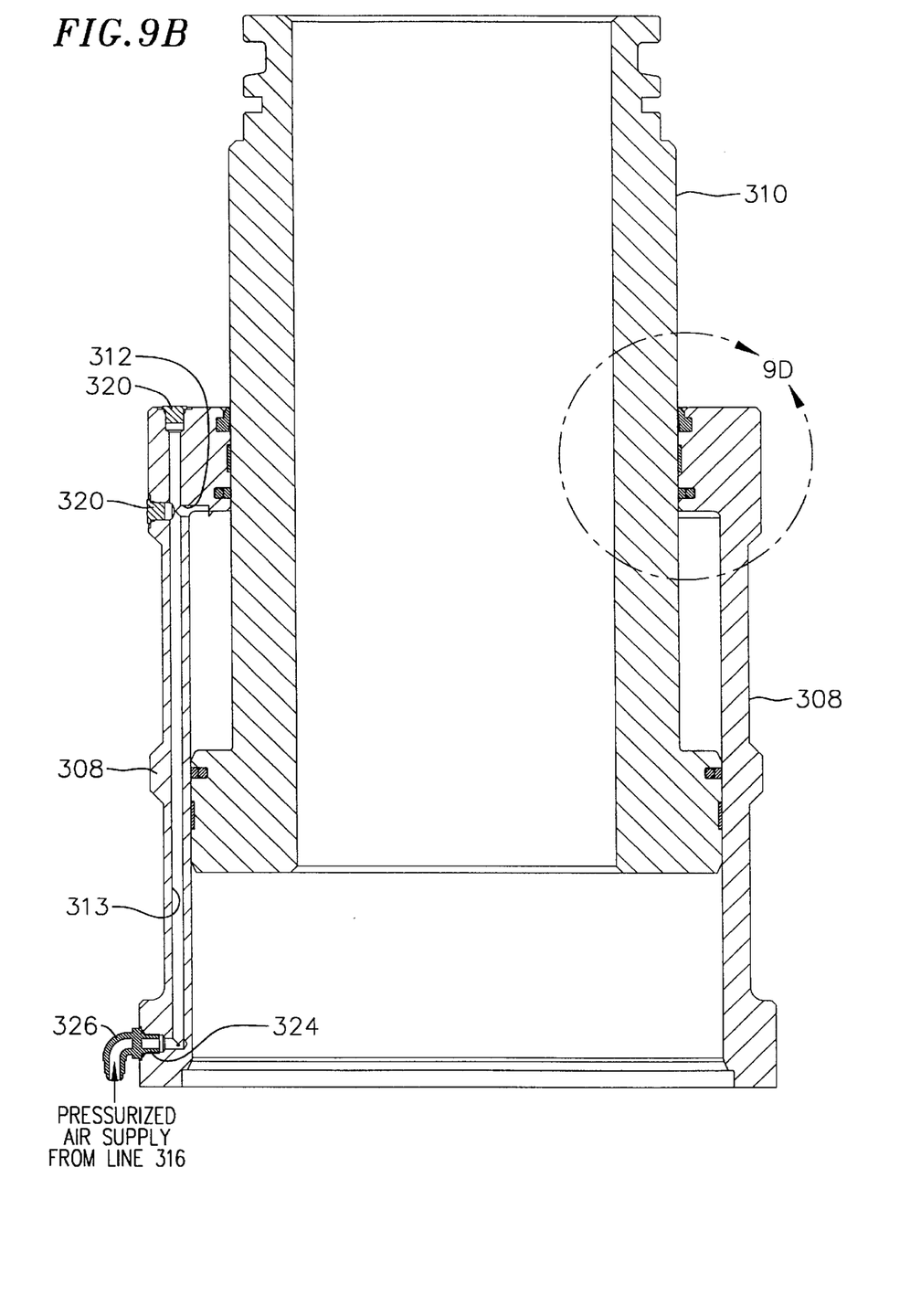
FIG. 9B is a sectional view of a portion of the load compensator according to one embodiment of the invention.
Figure 9C:
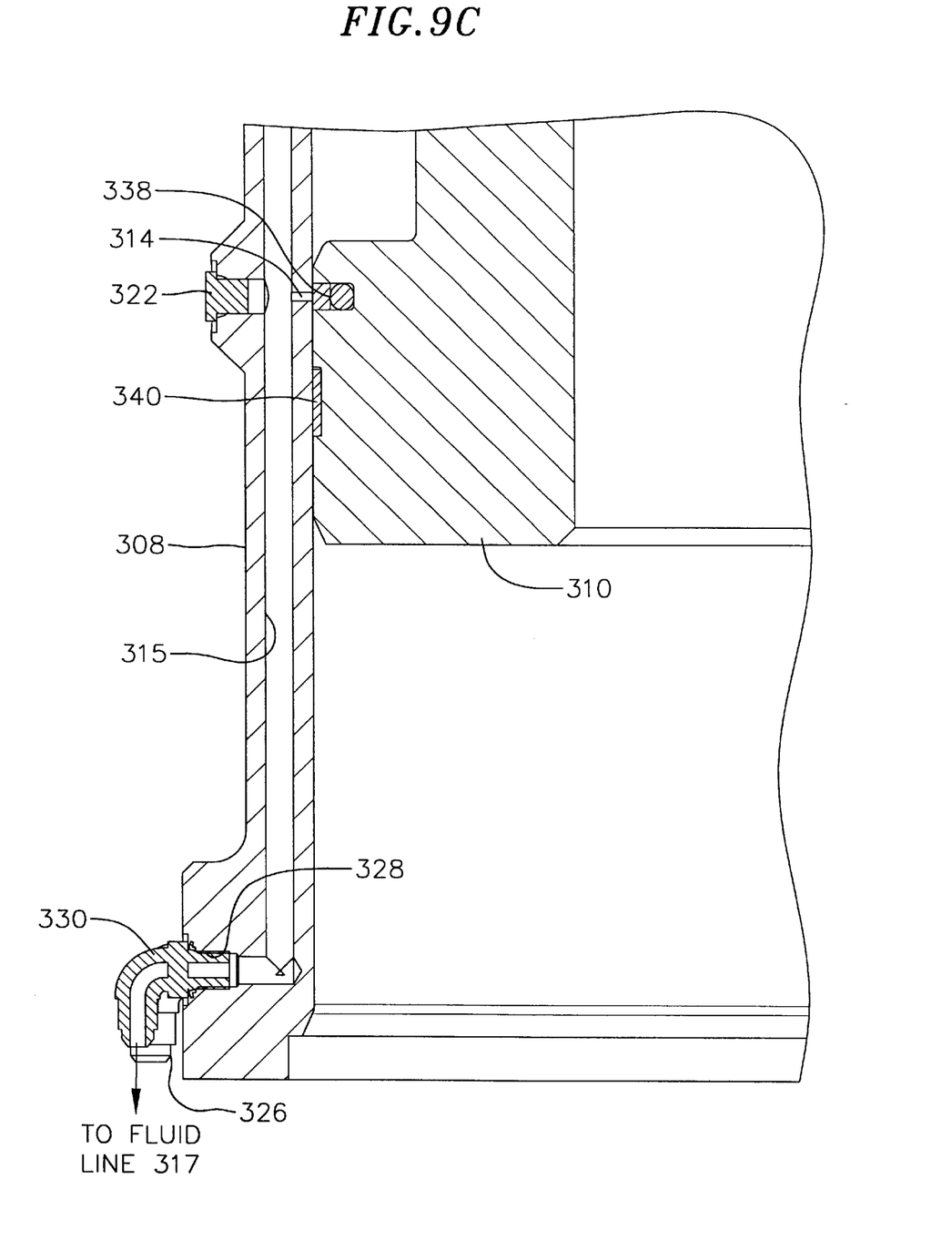
FIG. 9C is a sectional view of a portion of the load compensator according to one embodiment of the invention.

Barrel 308 is formed with two ports in its outer wall, a first port (inlet port) 312 disposed adjacent the upper end of barrel 308, and a second port (sensing port) 314 disposed at a preselected location below the first port 312 (FIGS. 9B and 9C). Each of the ports 312 and 314 is connected to control circuit 306 for the automatic operation of system 300, as is described in more detail below.

Load compensator 304 preferably uses air as the cushing medium, rather than hydraulic oil, although it should be understood that a hydraulic oil cushing medium could be alternatively used. Because of this, specially designed piston and barrel seals are selected to accommodate air rather than hydraulic oil. Preferably, the seals are also selected for low hysteresis characteristics and low static friction.

Control circuit 306 includes a first pressurized air line 316 that is in fluid communication with the first port 312 through an internal passageway 313 in barrel 308. Also connected to air line 316 are a pair of directional control valves DV1 and DV2, a relief valve RV1, and a pressure reducing valve PRV1. Control circuit 306 includes a second fluid line 317 that is in fluid communication with the second port 314 and with the directional control valve DV1 through an internal passageway 315 in barrel 308. Also connected to air line 317 is a one-way needle valve NV1.

Thus, when pressurized air flows through the second port 314, passageway 315, and line 317, the pressurized air passes through NV1 and on to directional control valve DV1, causing DV1 to close, thereby preventing pressurized air from flowing through air line 316 to the first port 312. As is described in more detail below, pressurized fluid flows through second port 314 only when piston 310 is driven downwardly relative to barrel 308 to expose second port 314 to the pressurized air disposed above the piston seal.

Air line 316 is connected to a source of pressurized air, for example through the rotating head assembly 48. Thus, during operation of top drive system 24, pressurized air is delivered to air line 316. Assuming no pressurized air flows through needle valve NV1, directional control valve DV1 is open to allow the pressurized air to flow to first port 312. Because piston 310 is fixed in position by means of it being connected to the top drive assembly 24, the introduction of pressurized air into barrel 308 causes barrel 308 to be driven upwardly relative to piston 310, thereby drawing the CRT body 10 upwardly to relieve the load applied to the compression springs 302.

Once the barrel 308 is raised relative to piston 310 until second port 314 is in communication with the pressurized air inside of barrel 308, directional control valve DV1 closes due to pressurized air flowing through line 317, needle valve NV1, and on to valve DV1. Load compensator 304 is then disabled at a neutral midstroke position. The load from CRT body 10 is then jointly supported by the compression springs 302 and the load compensator 304.

When the load from the CRT body 10 is reduced, for example, when the top drive assembly 24 lowers until a pipe segment carried by the CRT body 10 engages the top of the pipe string, the CRT body 10, and therefore the barrel 308, is driven upwardly relative to piston 310. This causes the volume of space within the barrel 308 that is occupied by pressurized air to increase, which in turn causes the pressurized air inside the barrel to slightly expand with only a minimal pressure drop. Therefore, the upward force of load compensator 304 on the CRT body 10 reduces by a minimal amount. At the same time, the compression springs 302 also expand, such that the compression load in the springs reduces by a small (but detectable) amount. Thus, the load on the top of the pipe string is equal to the drop of force related to the expansion of the compression springs 302.

When the load from the CRT body 10 increases, for example, when the pipe segment is threadedly engaged with the stationary pipe string, the barrel 308 is displaced downwardly relative to piston 310. Once the second port 314 is no longer in fluid communication with the pressurized air inside of the barrel 308 (FIG. 9C), directional control valve DV1 again opens to allow pressurized air to flow through valves DV1, DV2 and first port 312 into barrel 308, until the piston 310 passes port 314 and valve DV1 closes again. Thus, load compensator 304 is automatically returned to its neutral midstroke position.

When an excessive downward load is applied to the CRT body 10, for example, when the CRT body 10 is lifting a relatively heavy pipe string, the compression springs 302 are compressed until they stall out. In addition, the barrel 308 is drawn downwardly relative to the piston 310 until the air chamber inside the barrel 308 is very small. This causes the pressure inside the barrel 308 to exceed a preset threshold value. Pressure relief valve RV1 then opens and bleeds off the excess pressure.

In addition, when the top drive system 24 is raised upwardly after lowering the CRT body onto the top of the pipe string, the full load from the CRT body is applied to the load compensator 304 and to the compression springs 302, which may be more than the expanded air inside the compensator can bear. In such a case, piston 310 is raised upwardly relative to barrel 308 until the pressurized air no longer flows through second port 314. Pressurized air is then delivered to compensator through first port 312 to increase the pressure inside of compensator 304. Once equilibrium is reached, the compensator 304 is again in the neutral midstroke position.

Directional control valve DV2 is connected to the pressurized fluid line 316 and is disposed between directional control valve DV1 and first port 312. DV2 is controlled by a separate fluid line 319, which controls DV2 between open and closed positions. DV2 is normally open (i.e., when there is no air flowing through fluid line 319). Thus, DV2 allows pressurized air from to flow through first port 312, as controlled by valve DV1. However, when air flows through fluid line 319, DV2 is closed, thereby preventing pressurized air from flowing into barrel 308, regardless of the status of valve DV1. Therefore, valve DV2 can be used to manually control compensator 304. For example, when breaking out a pipe connection, it may be desirable to disable compensator 304 when the last thread is disengaging. This can be done by simply closing DV2. As is shown in FIG. 8, in one illustrative embodiment valve DV2 is connected to the same line that controls the retraction of the slips in the spider 74.

The function of pressure reducing valve PRV1 is to simply regulate the pressure being applied to compensator 304. If the pressure in line 316 exceeds the preset threshold, PRV1 operates to reduce the pressure to an acceptable level.

It will be apparent to those skilled in the art that system 300 can function without needle valve NV1. However, when compensator 304 is in the neutral midstroke position and small variances in the load occur, directional control valve DV1 could oscillate between open and closed positions. NV1 acts to dampen the air flow to DV1 to reduce the likelihood of DV1 oscillating.

Referring now to FIG. 9A, there is shown a top plan of load compensator 304. Load compensator includes a pair of plugs 320 and 322 that seal the upper ends of the respective internal passageways 313 and 315.

Referring to FIG. 9B, barrel 308 includes an opening 324 in fluid communication with passageway 313. An elbow fitting 326 is engaged at one end with opening 326 and is connected at its other end with fluid line 316.

Referring to FIG. 9C, barrel 308 includes an opening 328 in fluid communication with passageway 315. An elbow fitting 330 is engaged at one end with opening 326 and is connected at its other end with fluid line 316.

Figure 9D:
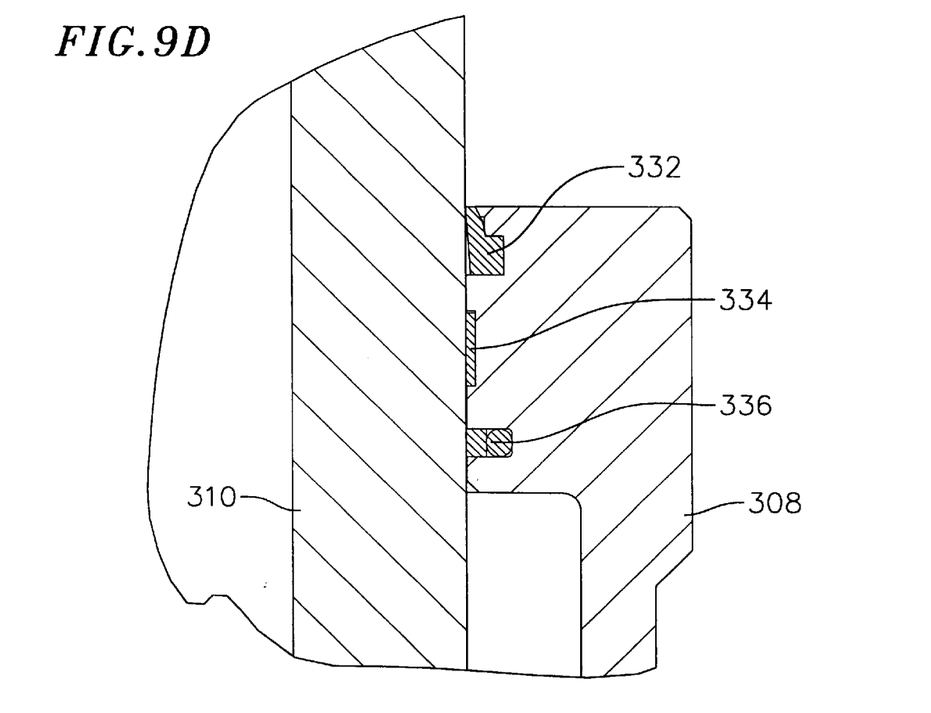
FIG. 9D is a sectional view of a portion of the load compensator according to one embodiment of the invention.
Figure 10:
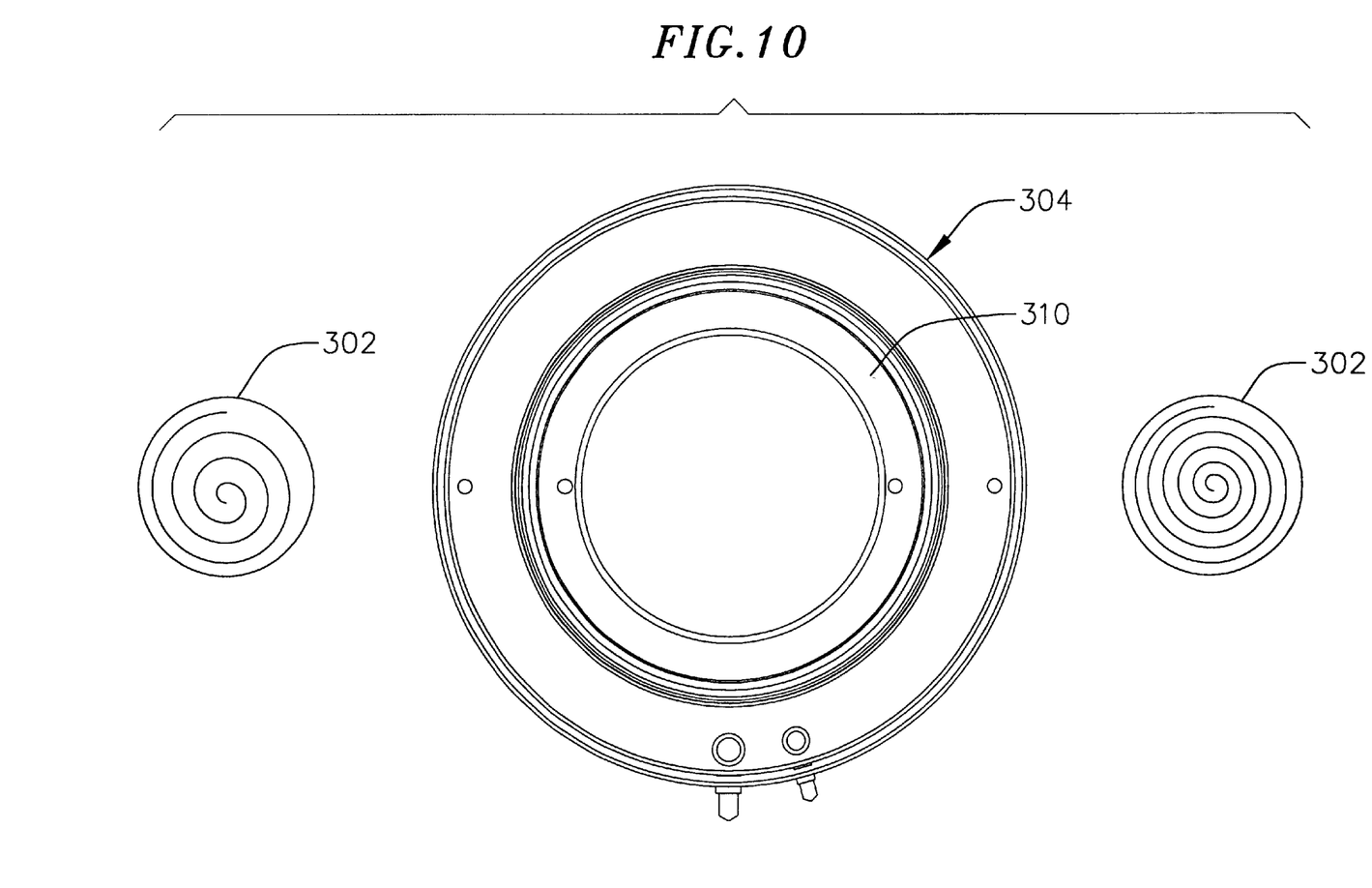
FIG. 10 is a top plan view of the load compensator and surrounding compression springs that cooperate to compensate for a load.
Figure 11:
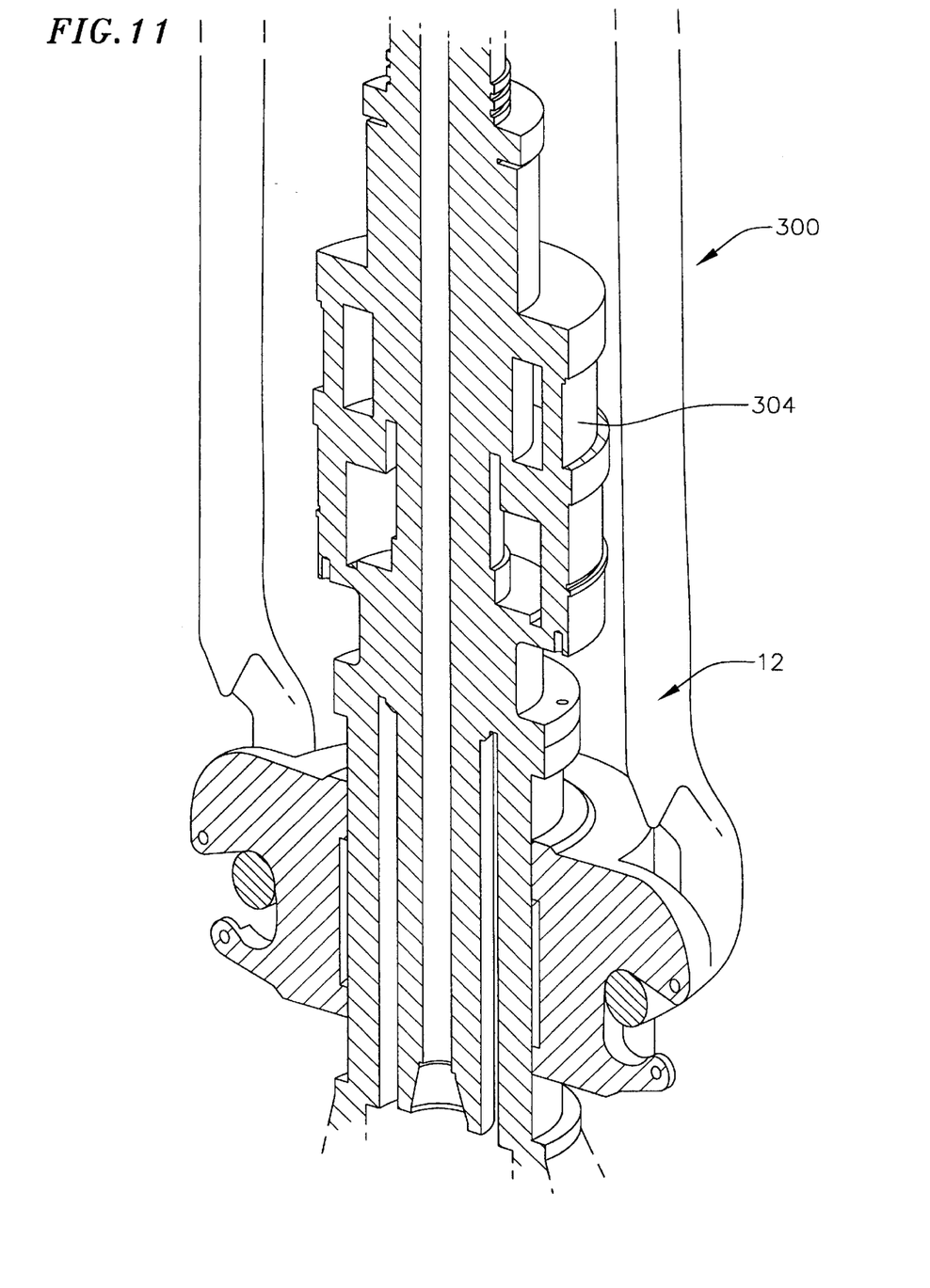
FIG. 11 is a cross-sectional view of a pipe running tool with load compensator according to the current invention.

Barrel 308 and piston 310 preferably include a number of seals and guiding strips to make the load compensator air-tight. Thus, in one embodiment barrel 308 includes a wiper 332, guiding strip 334, and internal seal 336 (FIG. 9D). Piston 310 preferably includes an external seal 338 and guiding strip 340.

From the foregoing, it will be apparent that the system 300 provides two-way compensation for a load, including both downward and upward compensation. System 300 automatically provides such compensation, and is designed to return to a neutral midstroke position when not in use.

While several forms of the present invention have been illustrated and described, it will be apparent to those of ordinary skill in the art that various modifications and improvements can be made without departing from the spirit and scope of the invention. Accordingly, it is not intended that the invention be limited, except as by the appended claims.

What is claimed is:

1. A load compensator operative to compensate a load suspended from a structure, the compensator comprising:
   a housing having an inner wall, said housing being connected to the load;
   a piston slidably disposed within the housing and connected to the structure, said piston having an outer wall such that the outer wall of the piston and the inner wall of the housing define an air chamber, said piston and housing further having at least two seals spaced from each other and arranged to provide a fluid seal between the air chamber and the atmosphere;
   an inlet port being disposed at a predetermined location on the housing such that the inlet port is in fluid communication between a source of pressurized fluid and the air chamber;
   a sensing port disposed in the housing at a predetermined location spaced from the inlet port such that under specified load conditions the piston slides within the housing sufficiently that the sensing port comes into fluid communication with the air chamber; and
   a control circuit connected to the sensing port and operative in response to sensing pressurized fluid from the air chamber at the sensing port to prevent the flow of pressurized fluid through the inlet port.

2. The load compensator of claim 1, wherein the control circuit comprises a directional control valve that is connected to the sensing port and is driven to a closed position when pressurized fluid flows through the sensing port, and wherein the directional control valve is connected to the source of pressurized fluid.

3. The load compensator of claim 1, further comprising a plurality of compression springs connected to the load to cooperate with the load compensator to carry the load.

4. The load compensator of claim 1, wherein the control circuit comprises a needle valve connected to the sensing port, a directional control valve connected to the needle valve, and a pressurized fluid line connected to the directional control valve and to the inlet port.

5. The load compensator of claim 1, wherein the inlet port is disposed adjacent the upper end of the housing, and the sensing port is disposed adjacent the middle of the housing.

6. The load compensator of claim 1, wherein the control circuit comprises a pressurized fluid line leading to the inlet port, and a relief valve connected to the pressurized fluid line.

7. The load compensator of claim 6, wherein the control circuit further comprises a pressure reducing valve connected to the pressurized fluid line.

8. The load compensator of claim 1, wherein the pressurized fluid comprises air.

9. The load compensator of claim 1, wherein the load carried by the load compensator includes a lower pipe engagement assembly and at least one pipe segment.

10. The load compensator of claim 9, wherein the lower pipe engagement assembly comprises a spider\elevator.

11. The load compensator of claim 1, wherein the control circuit comprises a first fluid line leading from the sensing port, a directional control valve connected to the first fluid line, a pressurized fluid line leading to the inlet port and adapted to supply pressurized fluid to the inlet port, a relief valve connected to the pressurized fluid line, and wherein the directional control valve is also connected to the pressurized fluid line and is controlled by pressurized fluid in the first fluid line to block the flow of pressurized fluid through the pressurized fluid line.

12. The load compensator of claim 11, wherein the control circuit further comprises a pressure reducing valve connected to the pressurized fluid line that is operative to maintain the pressure in the pressurized fluid line below a predetermined threshold value.

13. A load compensator operative to compensate a load suspended from a structure, the compensator comprising:
   a housing having an inner wall, said housing being connected to the load;
   a piston slidably disposed within the housing and connected to the structure, said piston having an outer wall such that the outer wall of the piston and the inner wall of the housing define an air chamber, said piston and housing further having at least two seals spaced from each other and arranged to provide a fluid seal between the air chamber and the atmosphere;
   an inlet port being disposed at a predetermined location on the housing such that the inlet port is in fluid communication between a source of pressurized fluid and the air chamber;
   a sensing port disposed in the housing at a predetermined location spaced from the inlet port such that under specified load conditions the piston slides within the housing sufficiently that the sensing port comes into fluid communication with the air chamber; and
   a control circuit comprising a directional control valve that is connected to the sensing port and is driven to a closed position when pressurized fluid flows through the sensing port, and wherein the directional control valve is connected to the source of pressurized fluid to prevent the flow of pressurized fluid to the inlet port when the directional valve is in the closed position.

14. The load compensator of claim 13, further comprising a plurality of compression springs connected to the load to cooperate with the load compensator to support the load.

15. The load compensator of claim 13, wherein the control circuit further comprises a needle valve connected to the sensing port, a directional control valve connected to the needle valve, and a pressurized fluid line connected to the directional control valve and to the inlet port.

16. The load compensator of claim 13, wherein the inlet port is disposed adjacent the upper end of the housing, and the sensing port is disposed adjacent the middle of the housing.

17. The load compensator of claim 13, wherein the control circuit further comprises a pressurized fluid line leading to the inlet port, and a relief valve connected to the pressurized fluid line.

18. The load compensator of claim 17, wherein the control circuit further comprises a pressure reducing valve connected to the pressurized fluid line.

19. The load compensator of claim 13, wherein the pressurized fluid comprises air.

20. The load compensator of claim 13, wherein the load carried by the load compensator includes a lower pipe engagement assembly and at least one pipe segment.

21. The load compensator of claim 20, wherein the lower pipe engagement assembly comprises a spider\elevator.

22. The load compensator of claim 13, wherein the control circuit comprises a first fluid line leading from the sensing port and connected to the directional control valve, a pressurized fluid line leading to the inlet port and adapted to supply pressurized fluid to the inlet port, and a relief valve connected to the pressurized fluid line, and wherein the directional control valve is also connected to the pressurized fluid line and is controlled by pressurized fluid in the first fluid line to block the flow of pressurized fluid through the pressurized fluid line.

23. The load compensator of claim 22, wherein the control circuit further comprises a pressure reducing valve connected to the pressurized fluid line that is operative to maintain the pressure in the pressurized fluid line below a predetermined threshold value.

24. A method of compensating a load suspended from a structure, comprising:

connecting the load to a housing having an inner wall and a piston slidably disposed within the housing and connected to the structure, said piston having an outer wall such that the outer wall of the piston and the inner wall of the housing define an air chamber, said piston and housing further having at least two seals spaced from each other and arranged to provide a fluid seal between the air chamber and the atmosphere, an inlet port being disposed at a predetermined location on the housing such that the inlet port is in fluid communication between a source of pressurized fluid and the air chamber, a sensing port disposed in the housing at a predetermined location spaced from the inlet port such that under specified load conditions the piston slides within the housing sufficiently that the sensing port comes into fluid communication with the air chamber; and sensing the pressurized fluid such that when the pressurized fluid is sensed at the sensing port the flow of pressurized fluid through the inlet port is prevented such that the position of the piston is adjusted to compensate for the load.

25. A method of compensating a load suspended from a structure, comprising:

connecting the load to a housing having an inner wall and a piston slidably disposed within the housing and connected to the structure, said piston having an outer wall such that the outer wall of the piston and the inner wall of the housing define an air chamber, said piston and housing further having at least two seals spaced from each other and arranged to provide a fluid seal between the air chamber and the atmosphere, an inlet port being disposed at a predetermined location on the housing such that the inlet port is in fluid communication between a source of pressurized fluid and the air chamber through a directional control valve, a sensing port disposed in the housing at a predetermined location spaced from the inlet port such that under specified load conditions the piston slides within the housing sufficiently that the sensing port comes into fluid communication with the air chamber; and sensing the pressurized fluid such that when the pressurized fluid is sensed flowing through the sensing port the directional valve is closed to prevent the flow of pressurized fluid to the inlet port such that the position of the piston is adjusted to compensate for the load.

26. A load compensator operative to compensate a load suspended from a structure, the compensator comprising:

a housing connected to the load and formed with an inlet port at a predetermined location on the housing that is adapted to be connected to a source of pressurized fluid, the housing further being formed with a sensing port at a predetermined location;

a piston that is slidably disposed within the housing and connected to the structure a control circuit that is connected to the sensing port and is operative in response to sensing pressurized fluid at the sensing port to prevent the flow of pressurized fluid through the inlet port; and a plurality of compression springs connected to the load to cooperate with the load compensator to carry the load.

* * * * *